(12) United States Patent
Terasaki et al.

(10) Patent No.: US 11,303,783 B2
(45) Date of Patent: Apr. 12, 2022

(54) DRIVE APPARATUS TO CHANGE THE OPTICAL PATH OF AN IMAGING APPARATUS

(71) Applicant: TDK CORPORATION, Tokyo (JP)

(72) Inventors: Yasuhiro Terasaki, Tokyo (JP); Naoki Yusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 558 days.

(21) Appl. No.: 16/279,420

(22) Filed: Feb. 19, 2019

(65) Prior Publication Data
US 2019/0260913 A1 Aug. 22, 2019

(30) Foreign Application Priority Data
Feb. 22, 2018 (JP) .............................. JP2018-029509

(51) Int. Cl.
| | |
|---|---|
| *H04N 3/08* | (2006.01) |
| *G02B 27/64* | (2006.01) |
| *G02B 26/10* | (2006.01) |
| *H04N 5/225* | (2006.01) |

(52) U.S. Cl.
CPC ............. *H04N 3/08* (2013.01); *G02B 26/105* (2013.01); *G02B 27/64* (2013.01); *H04N 5/2254* (2013.01)

(58) Field of Classification Search
CPC ...... H04N 3/08; H04N 5/2254; G02B 26/105; G02B 27/64; G02B 26/0816; G02B 26/0858
See application file for complete search history.

(56) References Cited

U.S. PATENT DOCUMENTS

2016/0306168 A1* 10/2016 Singh ................... G02B 26/105
2018/0188523 A1* 7/2018 Singh ................... H04N 5/2257

FOREIGN PATENT DOCUMENTS

JP         H10-004540 A        1/1998

* cited by examiner

*Primary Examiner* — Alicia M Harrington
(74) *Attorney, Agent, or Firm* — Oliff PLC

(57) ABSTRACT

A drive apparatus includes an actuator, an engaging body configured to frictionally engage the actuator, and an optical-path-changing member configured so as to be magnetically linked to the engaging body, and configured to change the direction of an optical path. The actuator causes the engaging body to move in a first direction and in a second direction opposite to the first direction. The optical-path-changing member moves due to being biased by the engaging body when the engaging body has moved in the first direction, and the optical-path-changing member moves following movement of the engaging body due to magnetic attraction when the engaging body has moved in the second direction.

11 Claims, 13 Drawing Sheets

DRIVE APPARATUS TO CHANGE THE OPTICAL PATH OF AN IMAGING APPARATUS

CROSS-REFERENCE TO RELATED APPLICATIONS

The disclosure is based upon and claims the benefit of priority from Japanese Patent Application No. 2018-029509 filed on Feb. 22, 2018, the entire contents of which are incorporated herein by reference.

TECHNICAL FIELD

The present disclosure relates to a drive apparatus.

BACKGROUND

There are drive apparatuses that, for example, change the direction of an optical path incident on an image sensor. One such a drive apparatus is, for example, described in Japanese Unexamined Patent Publication No. H10-004540. In the drive apparatus described in Japanese Unexamined Patent Publication No. H10-004540, a reflector is rotated in conjunction with a rotary knob being rotated by a user, whereby the direction of an optical path incident on an image sensor is changed.

SUMMARY

In the drive apparatus described in Japanese Unexamined Patent Publication No. H10-004540, the direction of the optical path is changed by the user rotating the rotary knob. Accordingly, in this technical field, there is a demand to be able to change the direction of an optical path with high precision using an actuator rather than relying on the user.

The present disclosure describes a drive apparatus with which the direction of an optical path is able to be changed with high precision using an actuator.

A drive apparatus according to an aspect of the present disclosure includes: an actuator; an engaging body configured to frictionally engage the actuator; and an optical-path-changing member configured so as to be magnetically linked to the engaging body, and configured to change the direction of an optical path, wherein the actuator causes the engaging body to move in a first direction and in a second direction opposite to the first direction, and the optical-path-changing member moves due to being biased by the engaging body when the engaging body has moved in the first direction, and the optical-path-changing member moves following movement of the engaging body due to magnetic attraction when the engaging body has moved in the second direction.

In this drive apparatus, due to the actuator causing the engaging body to move along the first direction, the optical-path-changing member can be caused to move. Moreover, because the engaging body and the optical-path-changing member are magnetically linked, the optical-path-changing member is suppressed from floating with respect to the engaging body. The drive apparatus is thereby able to cause the optical-path-changing member to move to an intended position when the actuator causes the engaging body to move. In this manner, the drive apparatus is able to change the direction of the optical path with high precision using the actuator.

A drive apparatus according to another aspect of the present disclosure includes: a lens module including a lens; an image sensor; an actuator; an engaging body configured to frictionally engage the actuator; and an optical-path-changing member configured so as to be magnetically linked to the engaging body, and configured to change the direction of an optical path incident on the image sensor through the lens module, wherein the actuator causes the engaging body to move in a first direction and in a second direction opposite to the first direction, and the optical-path-changing member moves due to being biased by the engaging body when the engaging body has moved in the first direction, and the optical-path-changing member moves following movement of the engaging body due to magnetic attraction when the engaging body has moved in the second direction.

In this drive apparatus, due to the actuator causing the engaging body to move along the first direction, the optical-path-changing member can be caused to move. The drive apparatus is thereby able to change the direction of the optical path incident on the image sensor. Moreover, because the engaging body and the optical-path-changing member are magnetically linked, the optical-path-changing member is suppressed from floating with respect to the engaging body. The drive apparatus is thereby able to cause the optical-path-changing member to move to an intended position when the actuator causes the engaging body to move. In this manner, the drive apparatus is able to change the direction of the optical path incident on the image sensor with high precision using the actuator.

The drive apparatus may further include: a stopper configured to restrict a range of movement of the optical-path-changing member, wherein the stopper restricts at least one range of movement out of a range of movement of the optical-path-changing member caused to move when the engaging body has moved in the first direction, or a range of movement of the optical-path-changing member caused to move when the engaging body has moved in the second direction. In this instance, the drive apparatus is able to prevent the optical-path-changing member from moving to an unintended position.

The drive apparatus may be configured such that: the actuator includes a piezoelectric element able to expand and contract along the first direction, and a shaft secured to a first direction end of the piezoelectric element, and the engaging body frictionally engages the shaft. In this instance, the actuator causes the optical-path-changing member to move through expansion and contraction of the piezoelectric element, enabling the direction of the optical path to be changed.

The drive apparatus may further include: a rotation-preventing guide configured to restrict rotation of the engaging body about the shaft. In this instance, in the drive apparatus, the rotation-preventing guide is able to prevent rotation of the engaging body, and a state is able to be maintained in which the engaging body is in contact with the optical-path-changing member.

The drive apparatus may further include: a position-detecting sensor configured to detect a position of the optical-path-changing member through a change in a magnetic field, wherein a magnet for magnetically linking with the engaging body is attached to a portion of the optical-path-changing member configured to make contact with the engaging body, and the position-detecting sensor detects a change in the magnetic field of the magnet attached to the optical-path-changing member. In this instance, in the drive apparatus, the magnet for magnetically linking the engaging body and the optical-path-changing member is also able to be used as a magnet for detecting the position of the optical-path-changing member. This allows the configuration of the drive apparatus to be simplified.

The drive apparatus may be configured such that: either a portion of the engaging body configured to make contact with the optical-path-changing member or a portion of the optical-path-changing member configured to make contact with the engaging body is formed with a convexly-curved shape. This allows the angle of contact between portions of the engaging body and the optical-path-changing member that make contact with one another in the drive apparatus to be smoothly changed, even in cases in which the angle of contact between these contact portions changes when the engaging body has moved. Further, because one of these contact portions is formed with a convexly-curved shape, these contact portions are in point-contact. In this instance, the magnetic linking force between these contact portions is substantially constant even in cases in which the angle of contact between these contact portions changes. Thus, because the angle of contact between these contact portions is able to be smoothly changed, and because the magnetic linking force is substantially constant, the drive apparatus is able to change the direction of the optical path with high precision.

The drive apparatus may be configured such that: one of the portion of the engaging body configured to make contact with the optical-path-changing member and the portion of the optical-path-changing member configured to make contact with the engaging body is harder than the other of the portion of the engaging body configured to make contact with the optical-path-changing member and the portion of the optical-path-changing member configured to make contact with the engaging body. In this instance, in the drive apparatus, one of the contact portions between the engaging body and the optical-path-changing member on the side where it is desired that wear be suppressed is made harder than the other of the contact portions. This enables wear on the contact portions to be suppressed. Thus, because wear on the contact portions is able to be suppressed, the drive apparatus is able to change the direction of the optical path with high precision.

The drive apparatus may be configured such that: the optical-path-changing member is able to swing about a direction intersecting the first direction, and the actuator causes the optical-path-changing member to swing by moving the engaging body in the first direction and the second direction. In this instance, the drive apparatus is able to cause the optical-path-changing member to swing (is able to change the position thereof) simply by causing the engaging body to move along the first direction, and by swinging the optical-path-changing member, the drive apparatus is able to change the direction of the optical path.

A drive apparatus according to yet another aspect of the present disclosure includes: an actuator unit; and a driven body driven by the actuator unit, wherein the driven body is magnetically linked to the actuator unit.

In this drive apparatus, due to the actuator driving the driven body, the driven body can be caused to move. Further, because the actuator unit and the driven body are magnetically linked, the driven body is suppressed from floating with respect to the actuator unit. The drive apparatus is thereby able to cause the driven body to move to an intended position when the actuator unit drives the driven body. In this manner, the drive apparatus is able to cause the driven body to move with high precision using the actuator unit.

The drive apparatus may be configured such that: the actuator unit includes a piezoelectric element able to expand and contract along a predetermined direction, a shaft secured to one expansion/contraction direction end of the piezoelectric element, and an engaging body frictionally engaged to the shaft, and the driven body is magnetically linked to the engaging body. In this instance, the drive apparatus is able to cause the driven body to move through expansion and contraction of the piezoelectric element.

The drive apparatus may further include: a rotation-preventing guide configured to restrict rotation of the engaging body about the shaft. In this instance, in the drive apparatus, the rotation-preventing guide is able to prevent rotation of the engaging body, and a state is able to be maintained in which the engaging body is in contact with the driven body.

The drive apparatus may further include: a position-detecting sensor configured to detect a position of the driven body through a change in a magnetic field, wherein a magnet for magnetically linking with the actuator unit is attached to a portion of the driven body configured to make contact with the actuator unit, and the position-detecting sensor detects a change in the magnetic field of the magnet attached to the driven body. In this instance, in the drive apparatus, the magnet for magnetically linking the engaging body and the driven body is also able to be used as a magnet for detecting the position of the driven body. This allows the configuration of the drive apparatus to be simplified.

The drive apparatus may be configured such that: either a portion of the actuator unit configured to make contact with the driven body or a portion of the driven body configured to make contact with the actuator unit is formed with a convexly-curved shape. This allows the angle of contact between portions of the actuator unit and the driven body that make contact with one another in the drive apparatus to be smoothly changed, even in cases in which the angle of contact between these contact portions changes when the driven body is caused to move by the actuator unit. Thus, because the angle of contact between these contact portions is able to be smoothly changed, the drive apparatus is able to cause the driven body to move with high precision.

The drive apparatus may be configured such that: one of the portion of the actuator unit configured to make contact with the driven body and the portion of the driven body configured to make contact with the actuator unit is harder than the other of the portion of the actuator unit configured to make contact with the driven body and the portion of the driven body configured to make contact with the actuator unit. In this instance, in the drive apparatus, one of the contact portions between the actuator unit and the driven body on the side where it is desired that wear be suppressed is made harder than the other of the contact portions. This enables wear on the contact portions to be suppressed. Thus, because wear on the contact portions is able to be suppressed, the drive apparatus is able to cause the driven body to move with high precision.

The drive apparatus may be configured such that: the driven body is able to swing, and the actuator unit causes the driven body to swing. In this instance, the drive apparatus is able to cause the driven body to swing using the actuator unit.

According to these various aspects of the present disclosure, the direction of an optical path is able to be changed with high precision using an actuator.

DETAILED DESCRIPTION

Figure 1:
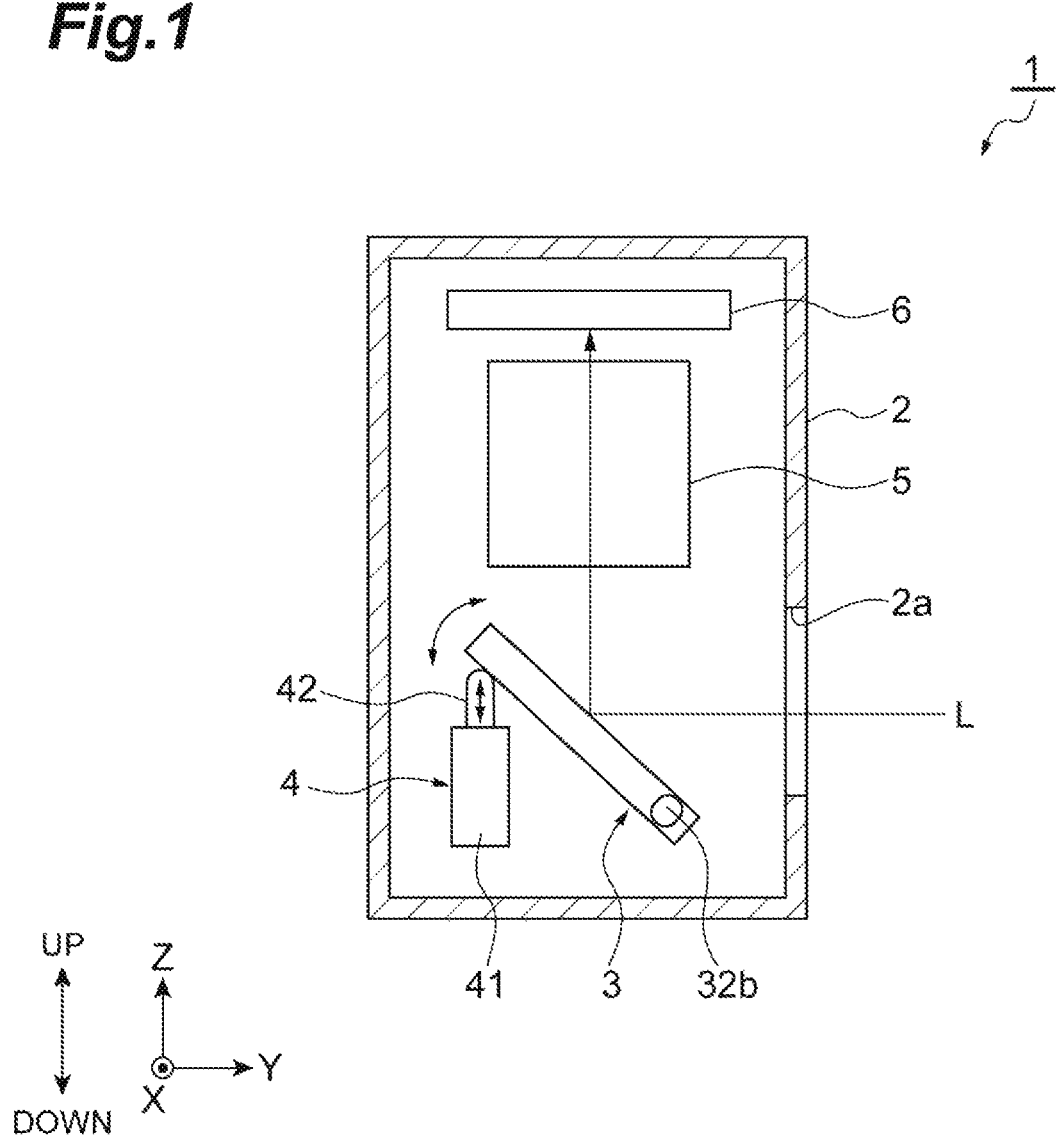
FIG. 1 is a diagram illustrating the schematic configuration of an imaging apparatus according to an embodiment.

Embodiments of the present disclosure will be described below with reference to the drawings. Note that in the description of the drawings, identical elements will be denoted using identical reference numerals, and duplicate description thereof will not be given.

The imaging apparatus (drive apparatus) 1 illustrated in FIG. 1 is a device for capturing images that is built into, for example, a digital camera, a mobile terminal, a smartphone, or the like. First, the schematic configuration of the imaging apparatus 1 will be described. The imaging apparatus 1 is provided with a holder 2, an optical-path-changing member (driven body) 3, an actuator unit 4, a lens module 5, and an image sensor 6. The optical-path-changing member 3, the actuator unit 4, the lens module 5, and the image sensor 6 are retained in the holder 2.

The optical-path-changing member 3 reflects light taken in through an opening 2a in the holder 2 so as to be incident on the image sensor 6 through the lens module 5. The optical-path-changing member 3 is caused to swing about a shank 32b by the actuator unit 4. The optical-path-changing member 3 is thereby able to change the direction of an optical path L incident on the image sensor 6. That is, by driving the optical-path-changing member 3, the imaging apparatus 1 is able to change the direction of a field of view when capturing an image using the image sensor 6.

The lens module 5 includes a lens. The lens module 5 may, for example, include zoom functionality. The lens module 5 may, for example, include image stabilization functionality with which images are stabilized by shifting the lens or the like. The image sensor 6 is an element that converts light into electrical signals. Various sensors can be used as the image sensor 6, such as, for example, a CCD image sensor or a CMOS image sensor.

Note that in the following description, to facilitate explanation, an XYZ Cartesian coordinate system is used to describe the arrangement, etc., of respective parts. Specifically, a Z axis is defined as an axis running in the direction in which the lens module 5 and the image sensor 6 are arranged. An X axis is defined as an axis running along the axis about which the optical-path-changing member 3 swings. A Y axis is defined as an axis orthogonal to both the X axis and the Z axis. When indicating a position or direction along the Z axis direction, the side of the lens module 5 on which the image sensor 6 is disposed is sometimes referred to as "up", and the opposite side thereto is sometimes referred to as "down". However, it should be noted that herein, "up" and "down" are used in order to facilitate explanation, and the imaging apparatus 1 is not actually limited to being disposed with an orientation corresponding to this "up" and "down".

Figure 2:
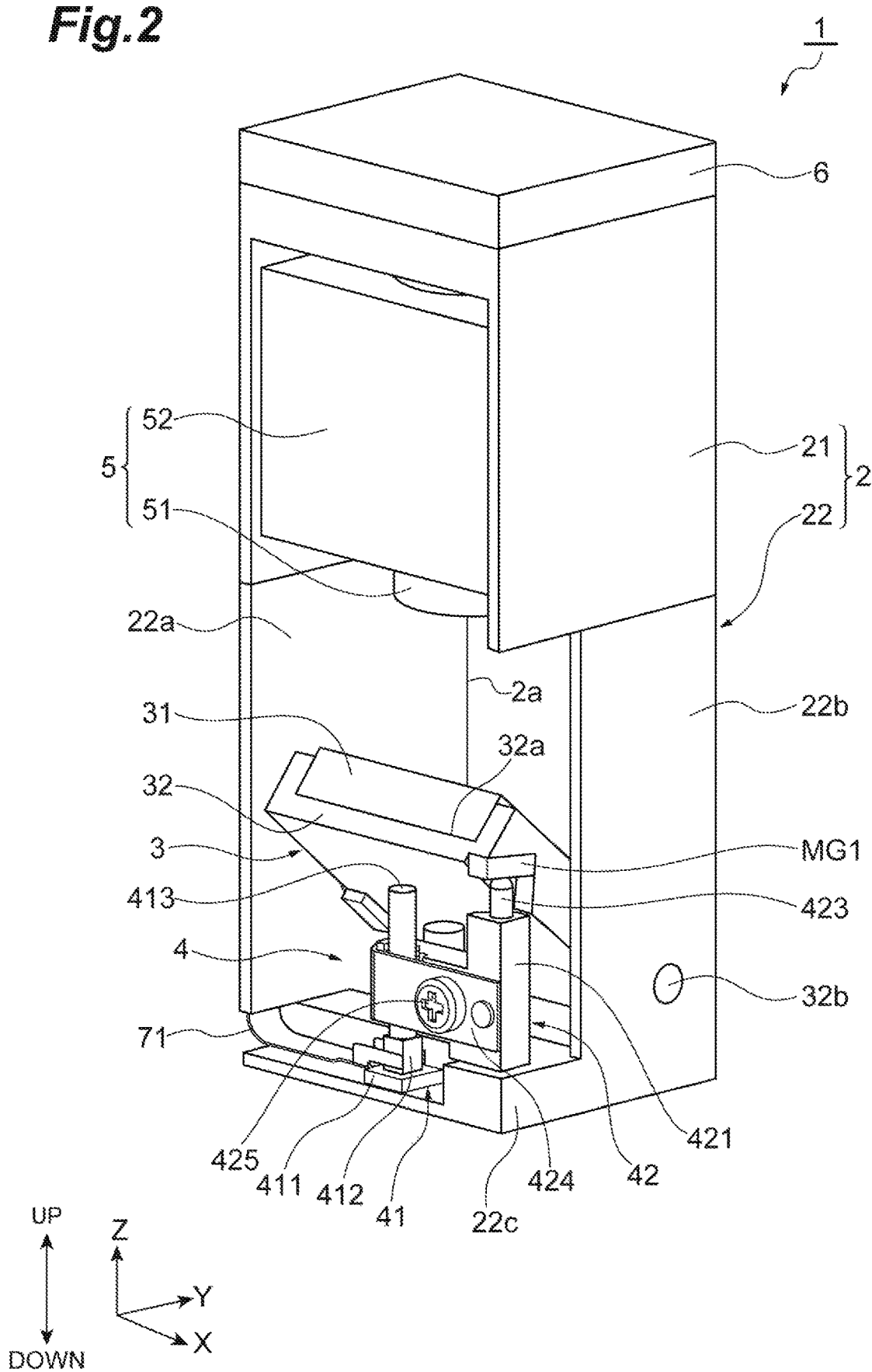
FIG. 2 is a perspective view illustrating the imaging apparatus in FIG. 1, as seen from an actuator unit side, in a state in which a magnet-side end of an optical-path-changing member has been pulled downward.
Figure 3:
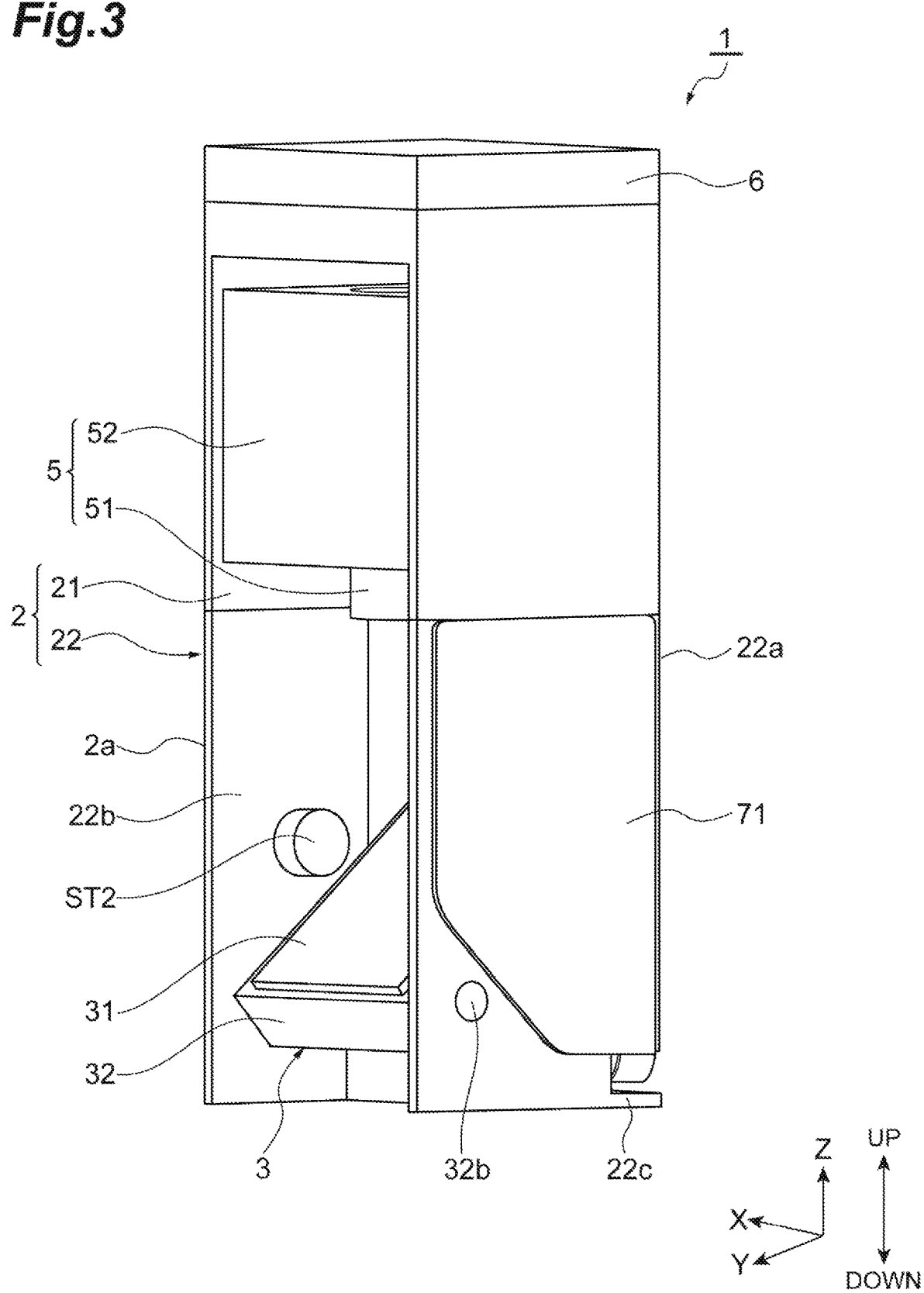
FIG. 3 is a perspective view illustrating the imaging apparatus in FIG. 1, as seen from an optical-path-changing member side, in a state in which the magnet-side end of the optical-path-changing member has been pulled downward.

The optical-path-changing member 3 and the actuator unit 4 of the imaging apparatus 1 will be described in detail below. As illustrated in FIGS. 2 and 3, the holder 2 of the imaging apparatus 1 includes a lens holder 21 and a mirror holder 22. The mirror holder 22 is coupled to a lower part of the lens holder 21. The lens module 5 includes a lens 51 and a lens base 52. The lens base 52 retains the lens 51. The lens base 52 is attached to the lens holder 21. At a position above the lens module 5, the image sensor 6 is secured to an upper face of the lens holder 21 so as to oppose the lens module 5. Note that an opening for passing light from the lens module 5 to the image sensor 6 is provided in the upper face of the lens holder 21.

The mirror holder 22 retains the optical-path-changing member 3 and the actuator unit 4. The mirror holder 22 includes a side panel 22a, a side panel 22b, and a base panel 22c. The side panel 22a and the side panel 22b oppose one another in the X axis direction. The base panel 22c couples a lower end of the side panel 22a and a lower end of the side panel 22b together. That is, the mirror holder 22 is open in the Y axis direction. One opening of the two openings in which the mirror holder 22 is open in the Y axis direction (the opening on the side that a mirror 31 of the optical-path-changing member 3 points toward) is the opening 2a in the holder 2 mentioned above.

The optical-path-changing member 3 reflects light incident thereon through the opening 2a in the holder 2 toward the image sensor 6. The optical-path-changing member 3 includes the mirror 31, a mirror base 32, and a magnet MG1. The mirror 31 is formed with a rectangular shape. The mirror 31 reflects light incident thereon through the opening 2a. The mirror 31 is attached to the mirror base 32. The optical-path-changing member 3 is disposed such that the mirror 31 points toward the image sensor 6. More specifically, so that light incident thereon through the opening 2a is able to be reflected toward the image sensor 6, the optical-path-changing member 3 is disposed such the direction that the surface of the mirror 31 points and the Z axis direction intersect one another.

In the present embodiment, a recessed portion 32a is provided in the upper face (in the surface on the image sensor 6 side) of the mirror base 32. An upper edge of the recessed portion 32a is exposed to the outside of the mirror base 32. The mirror 31 is set in the recessed portion 32a of the mirror base 32. That is, the periphery of the mirror 31 is surrounded on three sides by walls of the recessed portion 32a of the mirror base 32. The mirror 31 is positioned with respect to the mirror base 32 by setting the mirror 31 in the recessed portion 32a of the mirror base 32.

The mirror base 32 is interposed between the side panel 22a and the side panel 22b in the X axis direction. Of the outer peripheral faces of the mirror base 32, the two faces opposite one another in the X axis direction are each provided with a shank 32b that extends along the X axis direction. That is, of the outer peripheral faces of the mirror base 32, the face opposing the side panel 22a and the face opposing the side panel 22b are each provided with the shank 32b. In the present embodiment, the shank 32b is provided near the end of the outer peripheral faces of the mirror base 32 on the side furthest away from the image sensor 6. That is, the shank 32b is provided at a position near the lower end of the mirror base 32. The shank 32b is set in holes respectively in each of the side panel 22a and the side panel 22b, and is swingably supported thereby. The optical-path-changing member 3 is thus swingably retained by the mirror holder 22.

The magnet MG1 is provided at a location that makes contact with an engaging body 42 (pin 423), described below. The magnet MG1 is a magnet for magnetically linking with the engaging body 42. Specifically, the magnet MG1 is attached to a face of the mirror base 32 (the lower face of the mirror base 32) on the opposite side of the mirror base 32 to the face where the mirror 31 is attached. The magnet MG1 is provided near the end of the mirror base 32 on the opposite side of the mirror base 32 to the end where the shank 32b is provided. That is, the magnet MG1 is provided near the end of the mirror base 32 on the side of the mirror base 32 closest to the image sensor 6. The magnet MG1 is provided near the end of the mirror base 32 on the side of the mirror base 32 that opposes the side panel 22b of the mirror holder 22. The magnet MG1 is disposed such that the N pole points downward and the S pole points upward. The magnet MG1 may alternatively be disposed such that the S pole points downward and the N pole points upward.

The actuator unit 4 causes the optical-path-changing member 3 to swing about the shank 32b. The actuator unit 4 is provided on the opposite side of the optical-path-changing member 3 to the side of the optical-path-changing member 3 where the mirror 31 is attached. That is, the actuator unit 4 is provided at the lower side of the optical-path-changing member 3. The actuator unit 4 is provided with an actuator 41 and the engaging body 42. The engaging body 42 is frictionally engaged to the actuator 41.

Figure 4:
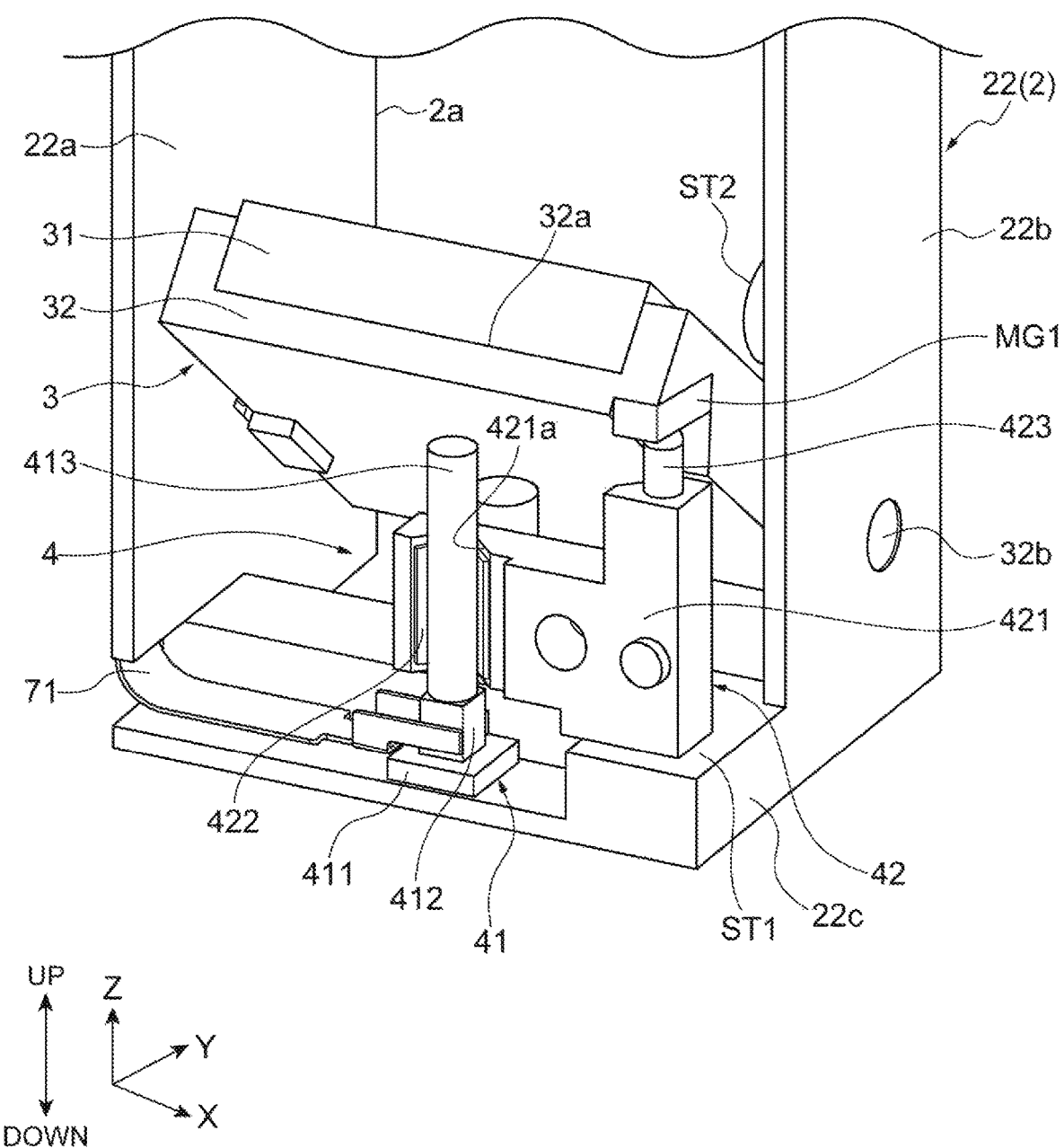
FIG. 4 is an enlarged perspective view illustrating an area around the actuator unit in FIG. 1 in a state in which the magnet-side end of the optical-path-changing member has been pulled downward.

First, the actuator 41 will be described in detail. As illustrated in FIGS. 2 and 4, the actuator 41 is an actuator configuring a smooth impact drive mechanism. Note that a plate spring 424 of the engaging body 42 has been removed in FIG. 4 in order to illustrate the portions of the actuator 41 and the engaging body 42 that engage one another. The engaging body 42 includes a piezoelectric element, and the engaging body 42 is moved along the Z axis direction as a result of expansion and contraction of this piezoelectric element. Specifically, the actuator 41 is provided with a weight 411, a piezoelectric element 412, and a shaft 413.

The piezoelectric element 412 is an element that is able to expand and contract along the Z axis direction (a first direction). The piezoelectric element 412 is configured from a piezoelectric material. The shaft 413 is formed with a cylindrical shape, and is disposed such that the axis of the cylindrical shape extends along the Z axis direction. The shaft 413 is secured to a Z axis direction upper end (one end) of the piezoelectric element 412. The weight 411 is secured to a Z axis direction lower end (other end) of the piezoelectric element 412. The weight 411 is formed from a material with a high specific gravity, such as tungsten or a tungsten alloy. The lower face of the weight 411 is secured to the upper face of the base panel 22c of the mirror holder 22. Note that the weight 411 and the base panel 22c may be secured using a flexible resin so as to be able to absorb vibration produced by the actuator 41.

A flexible printed circuit (FPC) 71 is connected to the piezoelectric element 412 of the actuator 41. The piezoelectric element 412 expands and contracts in the Z axis direction due to electrical power supplied by the FPC 71. As illustrated in FIGS. 3 and 4, the FPC 71 is affixed to an outer face of the side panel 22a of the mirror holder 22, and a lower end of the FPC 71 entering into the mirror holder 22 is connected to the piezoelectric element 412. The FPC 71 is also connected to a control circuit for controlling driving of the actuator 41, to a power source, and the like.

As illustrated in FIGS. 2 and 4, the engaging body 42 sandwiches the shaft 413 of the actuator 41 such that the engaging body 42 frictionally engages the shaft 413. The engaging body 42 sandwiches the outer circumferential surface of the shaft 413. That is, the engaging body 42 sandwiches the shaft 413 in a direction orthogonal to the Z axis direction. Specifically, the engaging body 42 is provided with an engaging body main section 421, a slider 422, a pin 423, and the plate spring 424.

The engaging body main section 421 is a member made of resin that extends along the X axis direction. The engaging body main section 421 is provided with a V-shaped groove 421a that extends along the Z axis direction at a location opposing the shaft 413. The slider 422 is a plate member made of metal that is formed with a V-shaped profile. The slider 422 is attached to the inside of the V-shaped groove 421a in the engaging body main section 421. The V-shaped inner face of the slider 422 makes contact with the outer circumferential surface of the shaft 413. The plate spring 424 extends along the X axis direction. The plate spring 424 is a spring member made of a flexible metal. The plate spring 424 is secured to the engaging body main section 421 by a screw 425, such that the shaft 413 is sandwiched between one end of the plate spring 424 and the slider 422.

The pin 423 is made of a magnetic substance such as a metal. The pin 423 is provided to an upper part of the engaging body main section 421, at a position opposing the magnet MG1 provided to the optical-path-changing member 3 in the Z axis direction. An upper end of the pin 423 is configured as a convex surface that curves toward the magnet MG1. The upper end of the pin 423 may, for example, have a hemispherical shape. The upper end of the pin 423 and the lower face of the magnet MG1 make contact with one another, and are magnetically linked. That is, the portion of the engaging body 42 that makes contact with the optical-path-changing member 3 is formed with a convexly-curved shape. Further, the magnet MG1 for magnetically linking with the engaging body 42 is attached to the portion of the optical-path-changing member 3 that makes contact with the engaging body 42.

Figure 9:
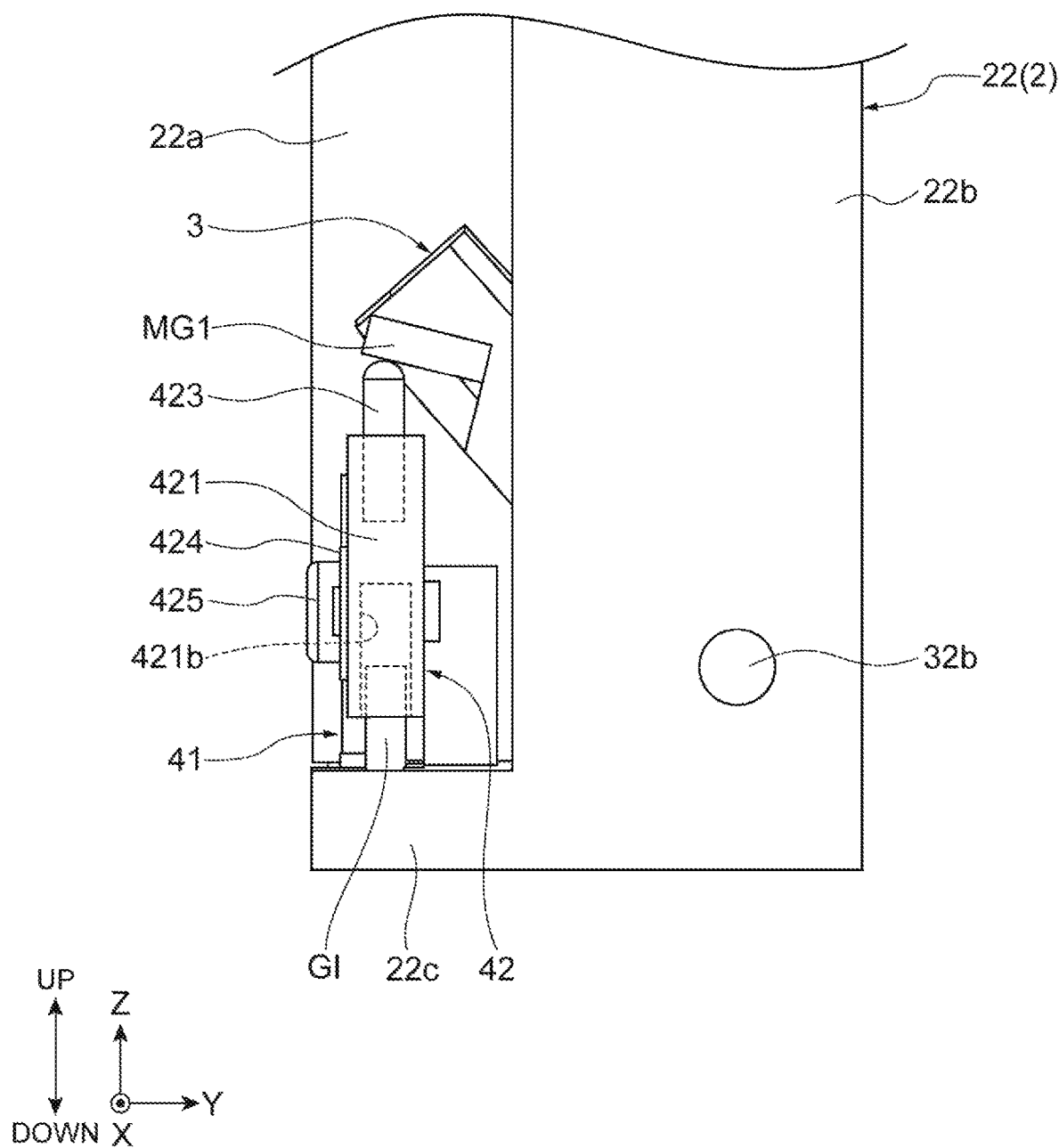
FIG. 9 is an enlarged side view illustrating an area around portions of the optical-path-changing member and the engaging body in FIG. 1 that make contact with one another in a state in which the magnet-side end of the optical-path-changing member has been pushed upward.

In the present embodiment, the pin 423 is harder than the magnet MG1. The pin 423 may, for example, be formed from a material that is harder than the magnet MG1. The surface of the pin 423 may also be given a coating whereby the pin 423 is made harder than the magnet MG1. A diamond-like carbon (DLC) coating or a polyether ether ketone (PEEK) resin coating may, for example, be used as such a coating. As illustrated in FIG. 9, the pin 423 may, for example, be integrally formed to an engaging body main section 421 made of resin using insert molding.

Figure 5:
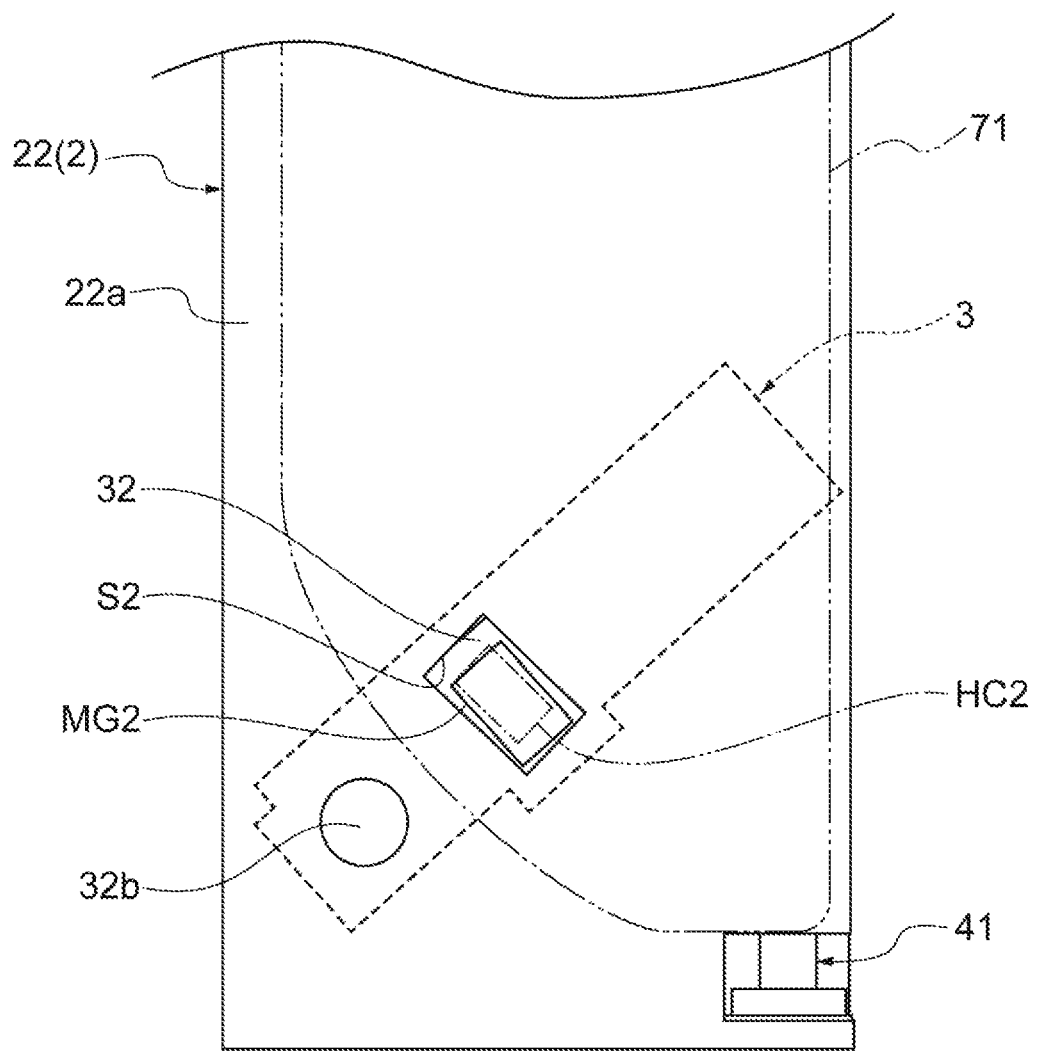
FIG. 5 is an enlarged side view illustrating an area around a sensor window of the imaging apparatus in FIG. 1.
Figure 5:
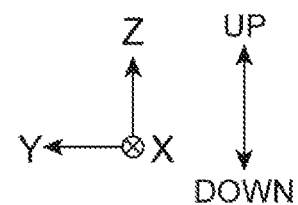

As illustrated in FIG. 5, of the outer faces of the mirror base 32 of the optical-path-changing member 3, a magnet MG2 is attached to the face that opposes the side panel 22a. The magnet MG2 is disposed such that the direction in which the N pole and the S pole thereof are arranged is substantially aligned with the thickness direction of the mirror base 32. A sensor window S2 is provided to the side panel 22a at a position opposing the magnet MG2. A Hall element HC2 is disposed in the sensor window S2 (see FIGS. 5 and 6). In the present embodiment, the Hall element HC2 is attached to the FPC 71 provided to the outer face of the side panel 22a. Note that in FIG. 5, in order to illustrate the magnet MG2, the FPC 71 and the Hall element HC2 are illustrated using virtual lines (double-dotted dashed lines). The Hall element HC2 and the magnet MG2 oppose one another in the X axis direction. The Hall element HC2 functions as a position-detecting sensor that detects the swing position (swing angle) of the optical-path-changing member 3 through a change in the magnetic field of the magnet MG2.

Figure 6:
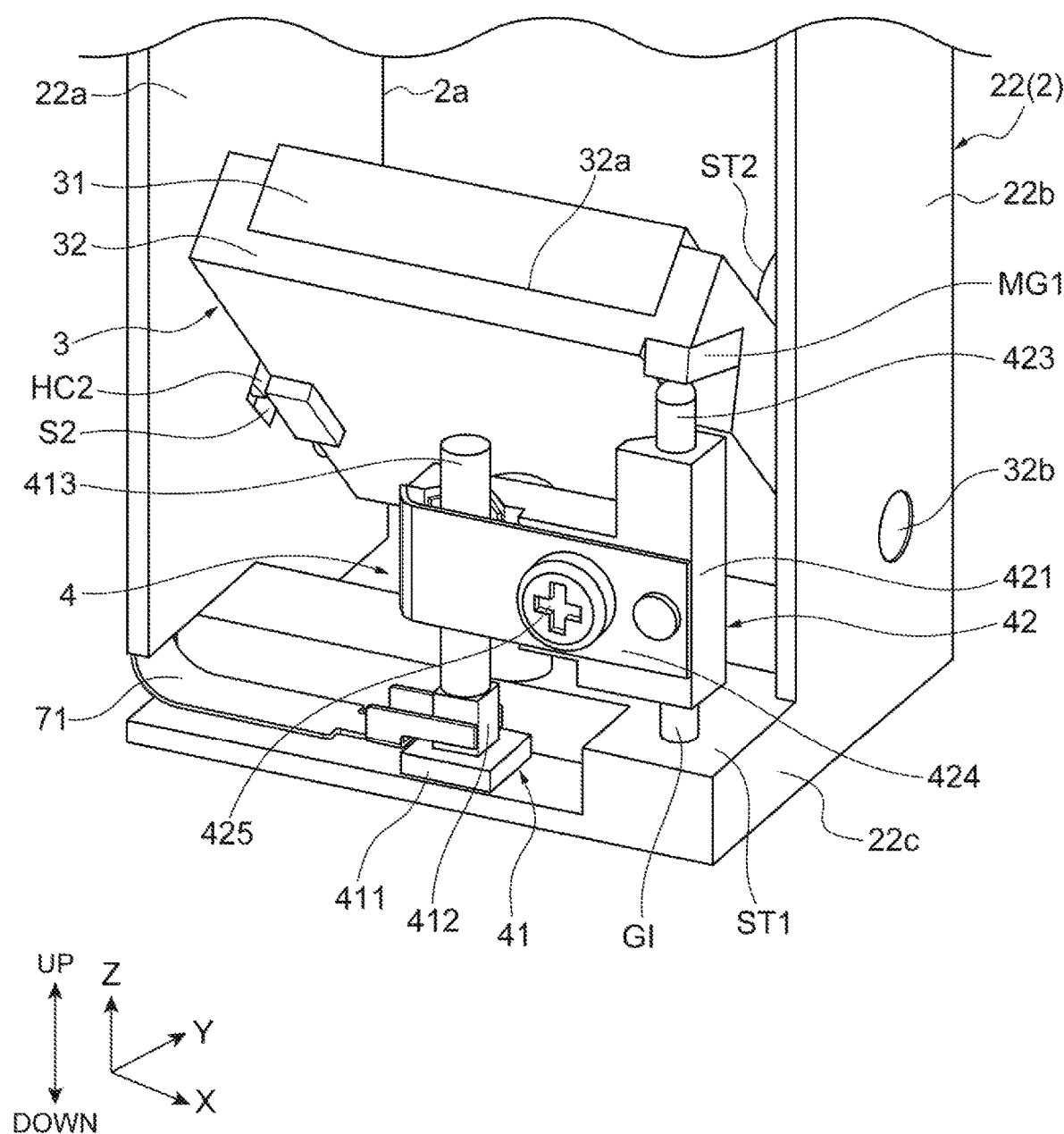
FIG. 6 is an enlarged perspective view illustrating an area around the actuator unit in FIG. 1 in a state in which the magnet-side end of the optical-path-changing member has been pushed upward.

As illustrated in FIG. 6, a guide pin (rotation-preventing guide) G1 is provided to an upper face of the base panel 22c of the mirror holder 22. The guide pin G1 extends along the Z axis direction. In the present embodiment, the position of guide pin G1 is aligned with the position of the pin 423 in the Z axis direction. As illustrated in FIG. 9, a recessed portion 421b extending along the Z axis direction is provided in a lower face of the engaging body main section 421. The guide pin G1 is inserted in the recessed portion 421b. In a state in which the guide pin G1 is inserted in the recessed portion 421b, the engaging body main section 421 is able to move along the Z axis direction with respect to the guide pin G1.

In cases in which the engaging body main section 421 has rotated about the shaft 413, the guide pin G1 makes contact with an inner face of the recessed portion 421b. The guide pin G1 thereby restricts rotation of the engaging body 42 about the shaft 413.

Next, configuration by which the actuator unit 4 causes the optical-path-changing member 3 to swing will be described. The actuator 41 is, for example, configured such that the speed of the actuator 41 when the piezoelectric element 412 expands and the speed of the actuator 41 when the piezoelectric element 412 contracts are different speeds, whereby the engaging body 42 frictionally engaging the shaft 413 can be caused to move upward along the Z axis direction (the first direction) or downward along the Z axis direction (a second direction).

The pin 423 of the engaging body 42 is magnetically linked to the magnet MG1 of the optical-path-changing member 3. Thus, the magnet MG1 of the optical-path-changing member 3 is biased by the pin 423 so as to move upward when the engaging body 42 has moved upward. As illustrated in FIG. 6, the optical-path-changing member 3 is thereby caused to swing about the shank 32b such that the magnet MG1-side end of the optical-path-changing member 3 moves upward. Further, due to the magnetic attraction between the magnet MG1 and the pin 423, the magnet MG1 of the optical-path-changing member 3 moves downward following movement of the engaging body 42 when the engaging body 42 has moved downward. That is, as illustrated in FIG. 4, the optical-path-changing member 3 is caused to swing about the shank 32b such that the magnet MG1-side end of the optical-path-changing member 3 moves downward.

In this manner, the optical-path-changing member 3 swings (moves) due to being biased by the engaging body 42 when the engaging body 42 has moved upward, and the optical-path-changing member 3 swings (moves) following the movement of the engaging body 42 due to magnetic attraction when the engaging body 42 has moved downward. As a result of being caused to swing by the actuator unit 4, the optical-path-changing member 3 is able to change the direction of the optical path L.

When the optical-path-changing member 3 swings, the position of the magnet MG2 changes with respect to the Hall element HC2. The Hall element HC2 is thus able to detect the swing position (swing angle) of the optical-path-changing member 3 on the basis of a change in the magnetic field of the magnet MG2 when the optical-path-changing member 3 is swung.

Figure 7:
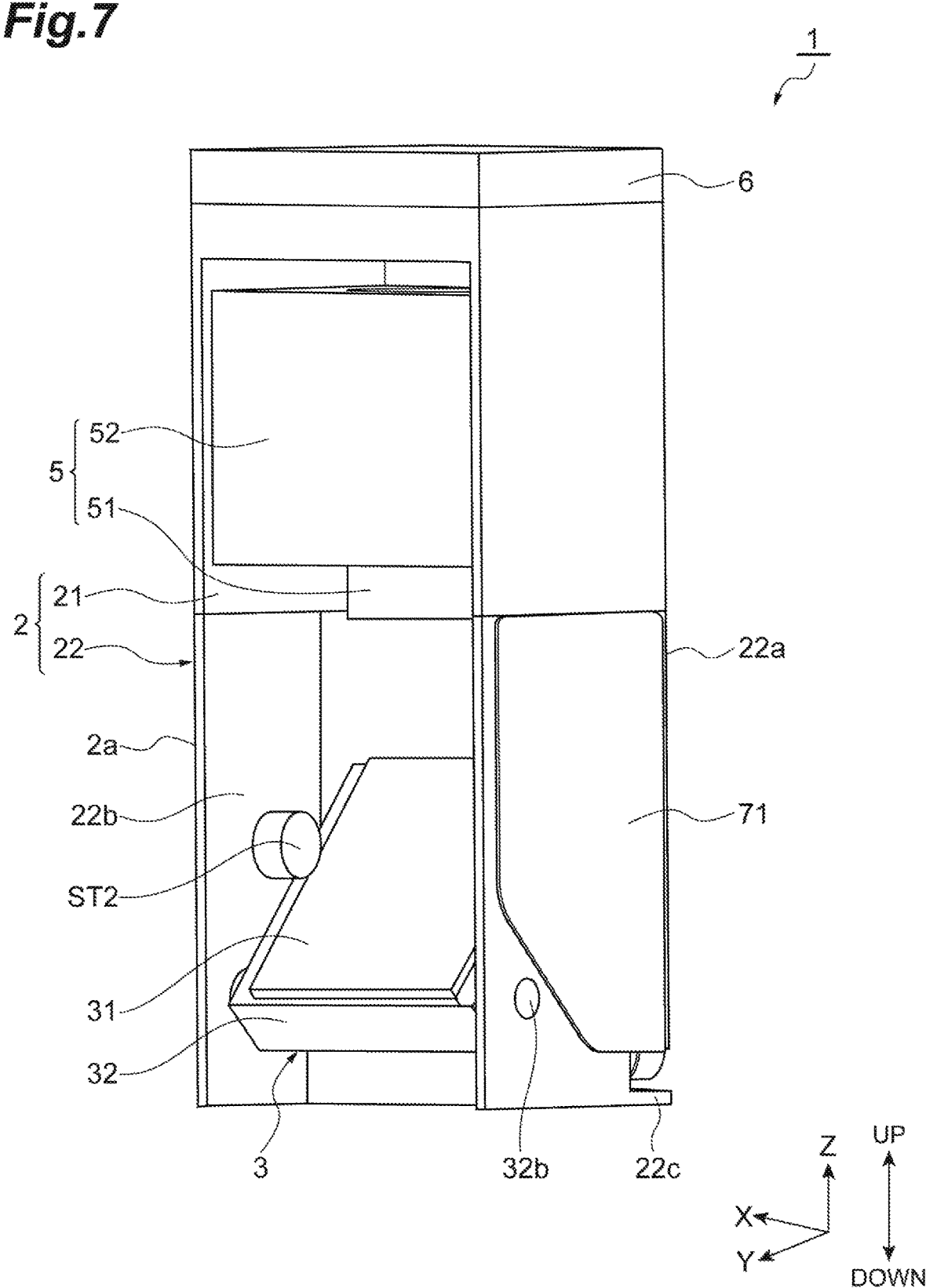
FIG. 7 is a perspective view illustrating the imaging apparatus in FIG. 1, as seen from the optical-path-changing member side, in a state in which the magnet-side end of the optical-path-changing member has been pushed upward.

As illustrated in FIG. 7, a stopper ST2 that projects toward the optical-path-changing member 3 is provided to the inner face of the side panel 22b of the mirror holder 22. As illustrated in FIGS. 6 and 7, the stopper. ST2 makes contact with the upper face of the optical-path-changing member 3 and restricts swinging of the optical-path-changing member 3 when the optical-path-changing member 3 has been caused to swing, such as when the magnet MG1-side end of the optical-path-changing member 3 moves upward. That is, the stopper ST2 restricts the range of swing (range of movement) of the optical-path-changing member 3 caused to swing when the engaging body 42 has moved upward.

As illustrated in FIG. 4, when the engaging body main section 421 has moved downward, the engaging body main section 421 makes contact with the upper face of the base panel 22c. This restricts movement of the engaging body main section 421. In this manner, when the optical-path-changing member 3 has been caused to swing such that the magnet MG1-side end of the optical-path-changing member 3 moves downward, swinging of the optical-path-changing member 3 is restricted by the upper face of the base panel 22c making contact with the engaging body main section 421. That is, the upper face of the base panel 22c functions as a stopper ST1 that restricts the range of swing (range of movement) of the optical-path-changing member 3 caused to swing when the engaging body 42 has moved downward.

Figure 8:
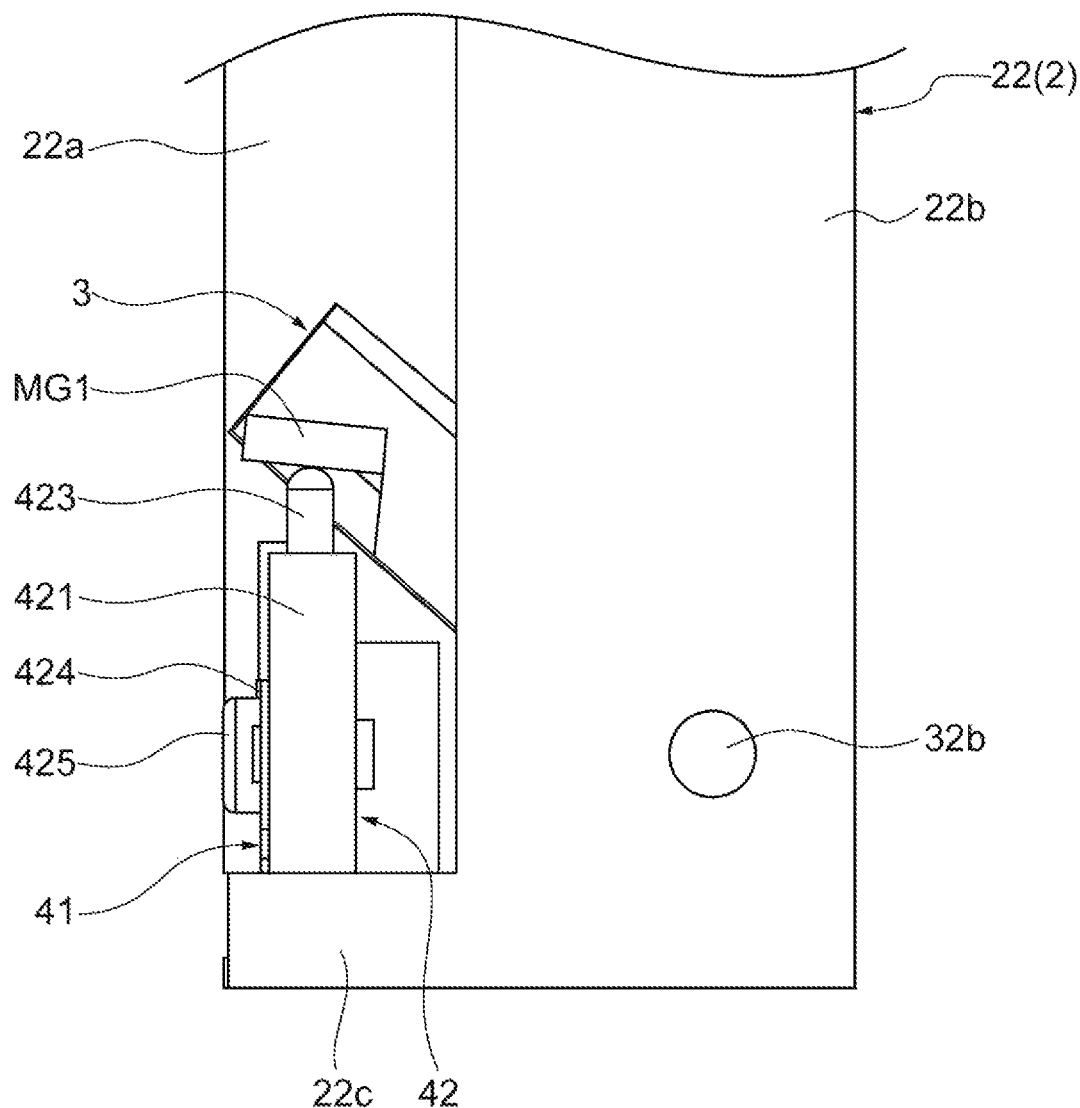
FIG. 8 is an enlarged side view illustrating an area around portions of the optical-path-changing member and an engaging body in FIG. 1 that make contact with one another in a state in which the magnet-side end of the optical-path-changing member has been pulled downward.

Further, as illustrated in FIGS. 8 and 9, in cases in which the engaging body 42 has moved in the up-down direction such that the optical-path-changing member 3 is swung, the orientation of the magnet MG1 with respect to the pin 423, and the position where the magnet MG1 makes contact with the pin 423, change. That is, the lower face of the magnet MG1 and upper end the pin 423 are magnetically linked so as to be capable of sliding with respect to one another, and such that the angle of contact therebetween is able to change.

As described above, in the imaging apparatus 1, due to the actuator 41 causing the engaging body 42 to move in the up-down direction, the optical-path-changing member 3 can be caused to swing. The imaging apparatus 1 is thereby able to change the direction of the optical path L incident on the image sensor 6. Moreover, because the engaging body 42 and the optical-path-changing member 3 are magnetically linked, the optical-path-changing member 3 is suppressed from floating with respect to the engaging body 42. Specifically, when the magnet MG1 of the optical-path-changing member 3 is biased by the pin 423 of the engaging body 42, for example, due to inertia when biased, the magnet MG1 is suppressed from coming away from the pin 423. Further, even in cases in which the engaging body 42 has moved downward, the imaging apparatus 1 is able to cause the optical-path-changing member 3 to swing so as to follow the movement of the engaging body 42 while the pin 423 and the magnet MG1 remain in a state of contact due to magnetic attraction. The imaging apparatus 1 is thereby able to cause the optical-path-changing member 3 to swing to an intended position (angle) when the actuator 41 causes the engaging body 42 to move. In this manner, the imaging apparatus 1 is able to change the direction of the optical path L incident on the image sensor 6 with high precision using the actuator 41.

The imaging apparatus 1 includes the stoppers ST1 and ST2 that restrict the range of swing of the optical-path-changing member 3. The imaging apparatus 1 is thereby able to prevent the optical-path-changing member 3 from swinging to an unintended position (angle). Further, the range of swing when the engaging body 42 causes the optical-path-changing member 3 to swing due to magnetic attraction is restricted by the stopper ST1. Consider, for example, a situation in which the range of swing when the engaging body 42 causes the optical-path-changing member 3 to swing due to magnetic attraction has been restricted by a stopper making contact with the optical-path-changing member 3. In such case, due to the engaging body 42 moving further downward after swinging of the optical-path-changing member 3 has been restricted by the stopper, the pin 423 of the engaging body 42 may come away from the magnet MG1 of the optical-path-changing member 3. When the optical-path-changing member 3 is caused to swing in cases in which the engaging body 42 and the optical-path-changing member 3 are separated from one another, it is necessary to cause the engaging body 42 to move such that the pin 423 and the magnet MG1 make contact with one another. It thus takes time to cause the optical-path-changing member 3 to swing. In contrast, in the imaging apparatus 1, because movement of the engaging body 42 is restricted by the stopper ST1, the magnet MG1 of the optical-path-changing member 3 and the pin 423 of the engaging body 42 do not separate from one another. Thus, in the imaging apparatus 1, even in a state in which swinging of the optical-path-changing member 3 is being restricted by the stopper ST1, the optical-path-changing member 3 can be quickly caused to swing when the engaging body 42 has moved upward.

The actuator 41 includes the piezoelectric element 412 that is able to expand and contract along the Z axis direction. In this instance, the actuator 41 causes the optical-path-changing member 3 to swing through expansion and contraction of the piezoelectric element 412, enabling the direction of the optical path L to be changed.

The imaging apparatus 1 is provided with a guide pin G1 that restricts rotational movement of the engaging body 42 about the shaft 413. In this instance, in the imaging apparatus 1, the guide pin G1 is able to prevent rotation of the engaging body 42, and a state is able to be maintained in which the engaging body 42 is in contact with the optical-path-changing member 3.

The upper end of the pin 423 of the engaging body 42 is formed with a convexly-curved shape. This allows the angle of contact between the pin 423 and the magnet MG1 in the imaging apparatus 1 to be smoothly changed, even in cases in which the angle of contact between the pin 423 and the magnet MG1 changes when the engaging body 42 has moved. Further, because the upper end of the pin 423 has a convexly-curved shape, the upper end of the pin 423 and the lower face of the magnet MG1 are in point-contact. In this instance, the magnetic linking force between the pin 423 and the magnet MG1 is substantially constant even in cases in which the angle of contact between the pin 423 and the magnet MG1 changes. Thus, because the angle of contact between the pin 423 and the magnet MG1 is able to be smoothly changed, and because the magnetic linking force is substantially constant, the imaging apparatus 1 is able to change the direction of the optical path L with high precision.

The pin 423 is harder than the magnet MG1. In this instance, in the imaging apparatus 1, the pin 423, this being the one of the pin 423 and the magnet MG1 on the side where it is desired that wear be suppressed, is made harder than the magnet MG1. This enables wear on the pin 423 to be suppressed. Thus, because wear on the pin 423 is suppressed, the imaging apparatus 1 is able to change the direction of the optical path L with high precision.

The actuator 41 causes the optical-path-changing member 3 to swing by causing the engaging body 42 to move. In this instance, the imaging apparatus 1 is able to cause the optical-path-changing member 3 to swing (is able to change the position thereof) simply by causing the engaging body 42 to move in the up-down direction, and by swinging the optical-path-changing member 3, the imaging apparatus 1 is able to change the direction of the optical path L.

Modified Example

Figure 10:
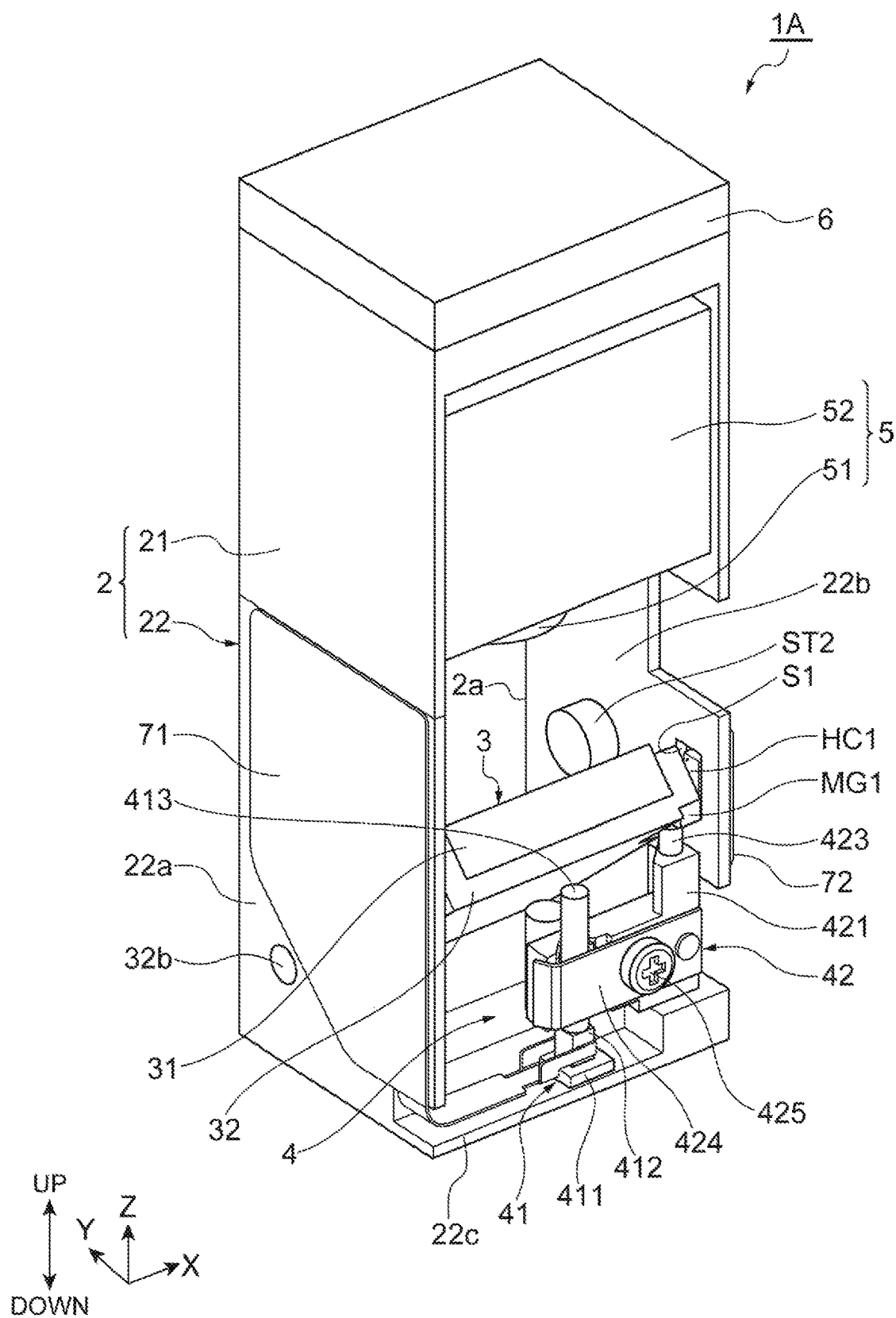
FIG. 10 is a perspective view of an imaging apparatus of a modified example, as seen from an actuator unit side.

Next, a modified example of the embodiment described above will be described. As illustrated in FIG. 10, an imaging apparatus 1A according to the present modified example also uses the magnet MG1 for magnetically linking the optical-path-changing member 3 and the engaging body 42 in order to detect the swing position of the optical-path-changing member 3. The imaging apparatus 1A is accordingly provided with a Hall element HC1 provided at a position opposing the magnet MG1 in the X axis direction. That is, the imaging apparatus 1A according to the present modified example is not provided with the magnet MG2 of the imaging apparatus 1 according to the above embodiment. In following description of the imaging apparatus 1A according to the present modified example, only points differing from the imaging apparatus 1 according to the above embodiment will be described. Constituent elements of the imaging apparatus 1A that are similar to constituent elements of the imaging apparatus 1 according to the above embodiment will be denoted in the drawings using identical reference numerals, and description thereof will not be given.

A sensor window S1 is provided in the side panel 22b of the mirror holder 22 at a position opposing the magnet MG1. The Hall element HC1 is disposed in the sensor window S1. In the present embodiment, the Hall element HC1 is attached to a FPC 72 (see FIGS. 10 and 11) provided to the outer face of the side panel 22b. The Hall element HC1 and the magnet MG1 oppose one another in the X axis direction. The Hall element HC1 functions as a position-detecting sensor that detects the swing position (swing angle) of the optical-path-changing member 3 through a change in the magnetic field of the magnet MG1.

Figure 11:
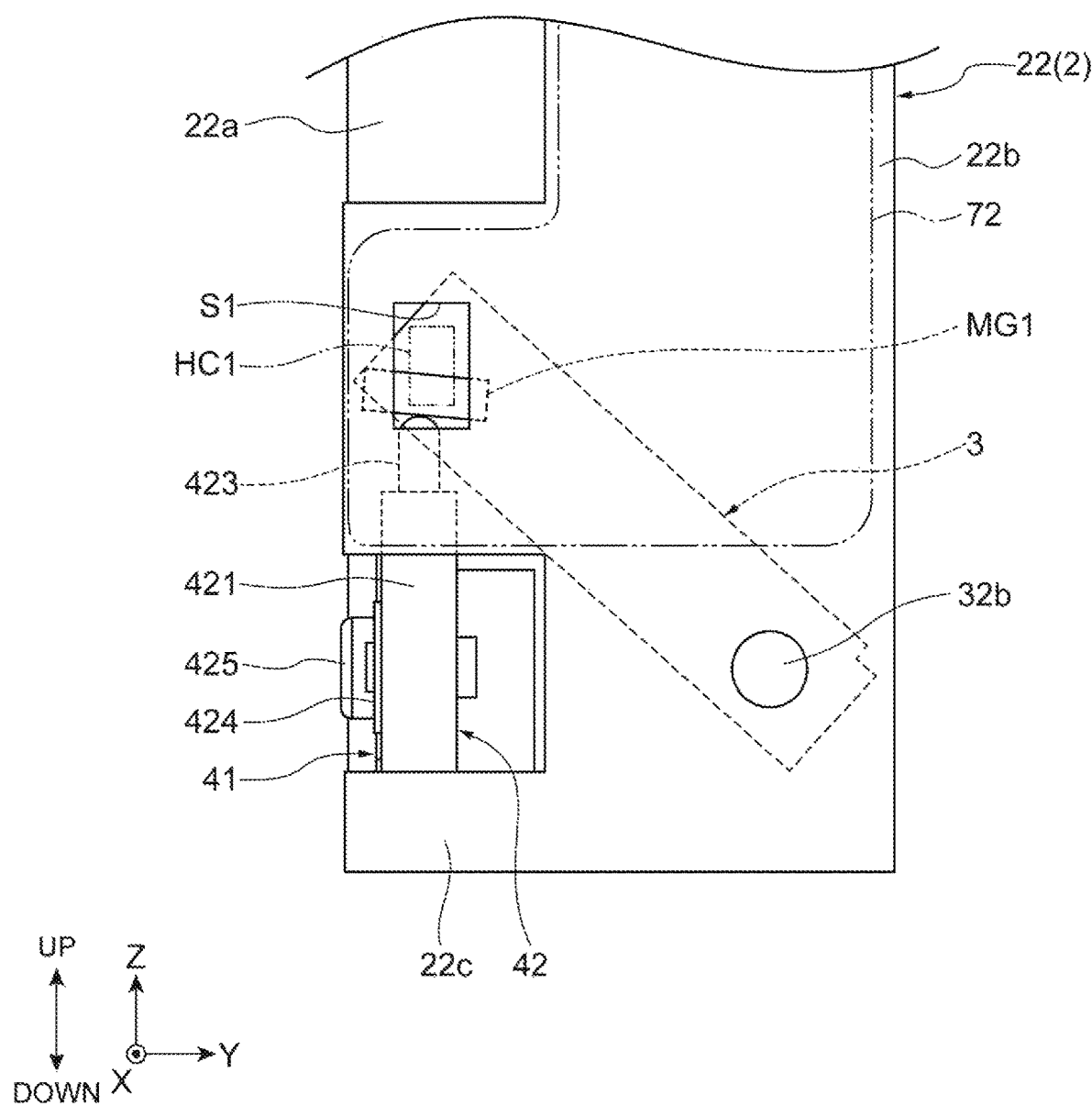
FIG. 11 is a side view illustrating swinging of the optical-path-changing member in FIG. 10 in a state in which a magnet-side end of the optical-path-changing member has been pulled downward.
Figure 12:
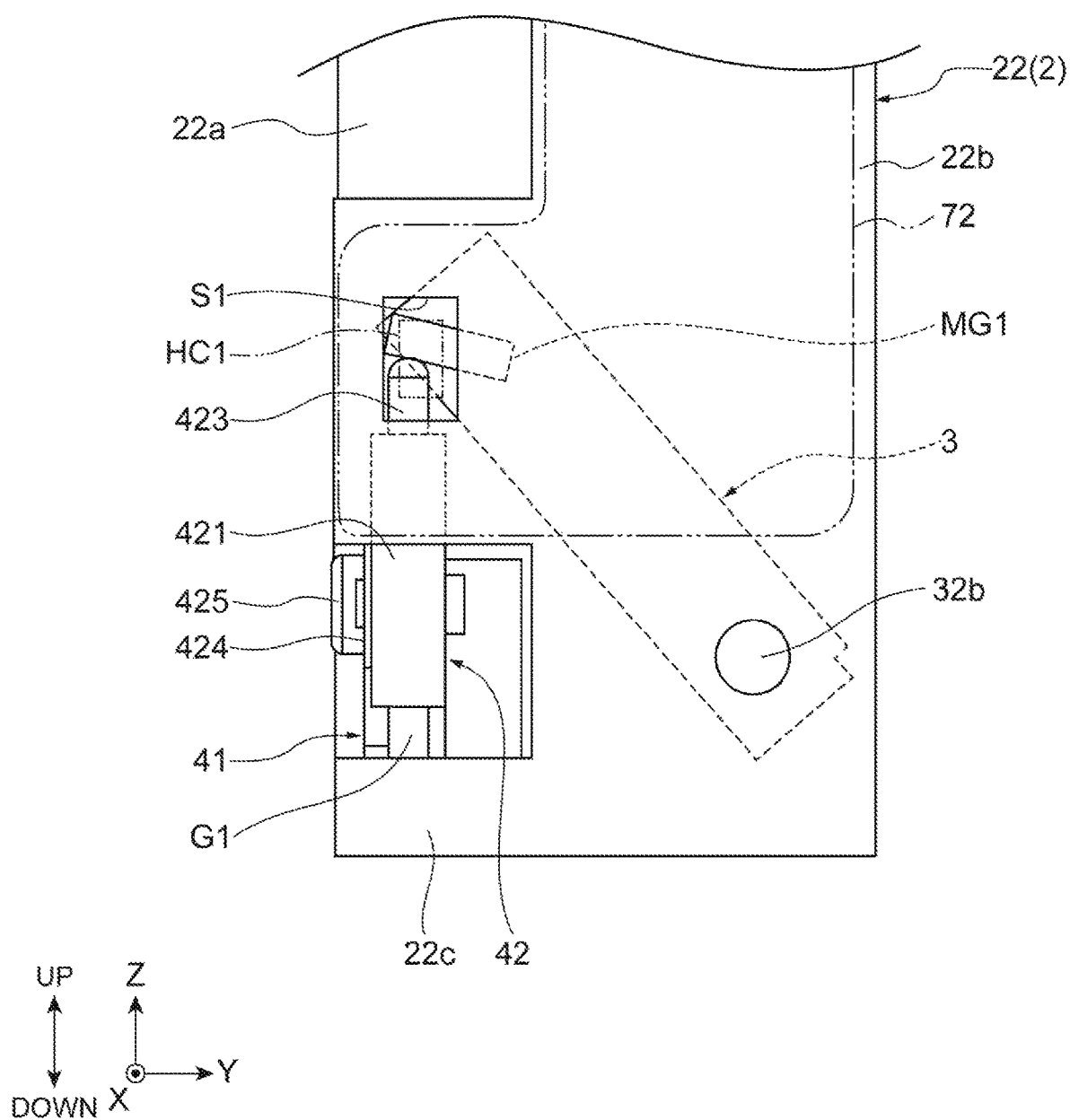
FIG. 12 is a side view illustrating swinging of the optical-path-changing member in FIG. 10 in a state in which the magnet-side end of the optical-path-changing member has been pushed upward.

As illustrated in FIGS. 11 and 12, when the optical-path-changing member 3 swings, the position of the magnet MG1 changes with respect to the Hall element HC1. The Hall element HC1 is thus able to detect the swing position (swing angle) of the optical-path-changing member 3 on the basis of a change in the magnetic field of the magnet MG1 when the optical-path-changing member 3 is swung.

Note that in FIGS. 11 and 12, in order to illustrate the change in position of the magnet MG1 when the optical-path-changing member 3 is swung, the FPC 72 and the Hall element HC1 are illustrated using virtual lines (double-dotted dashed lines).

In this instance as well, the imaging apparatus 1A has a similar functional effect to the imaging apparatus 1 in the above embodiment. Further, in the imaging apparatus 1A, the magnet MG1 for magnetically linking the engaging body 42 and the optical-path-changing member 3 is also used as a magnet for detecting the position of the optical-path-changing member 3. This allows the configuration of the imaging apparatus 1 to be simplified.

Figure 13:
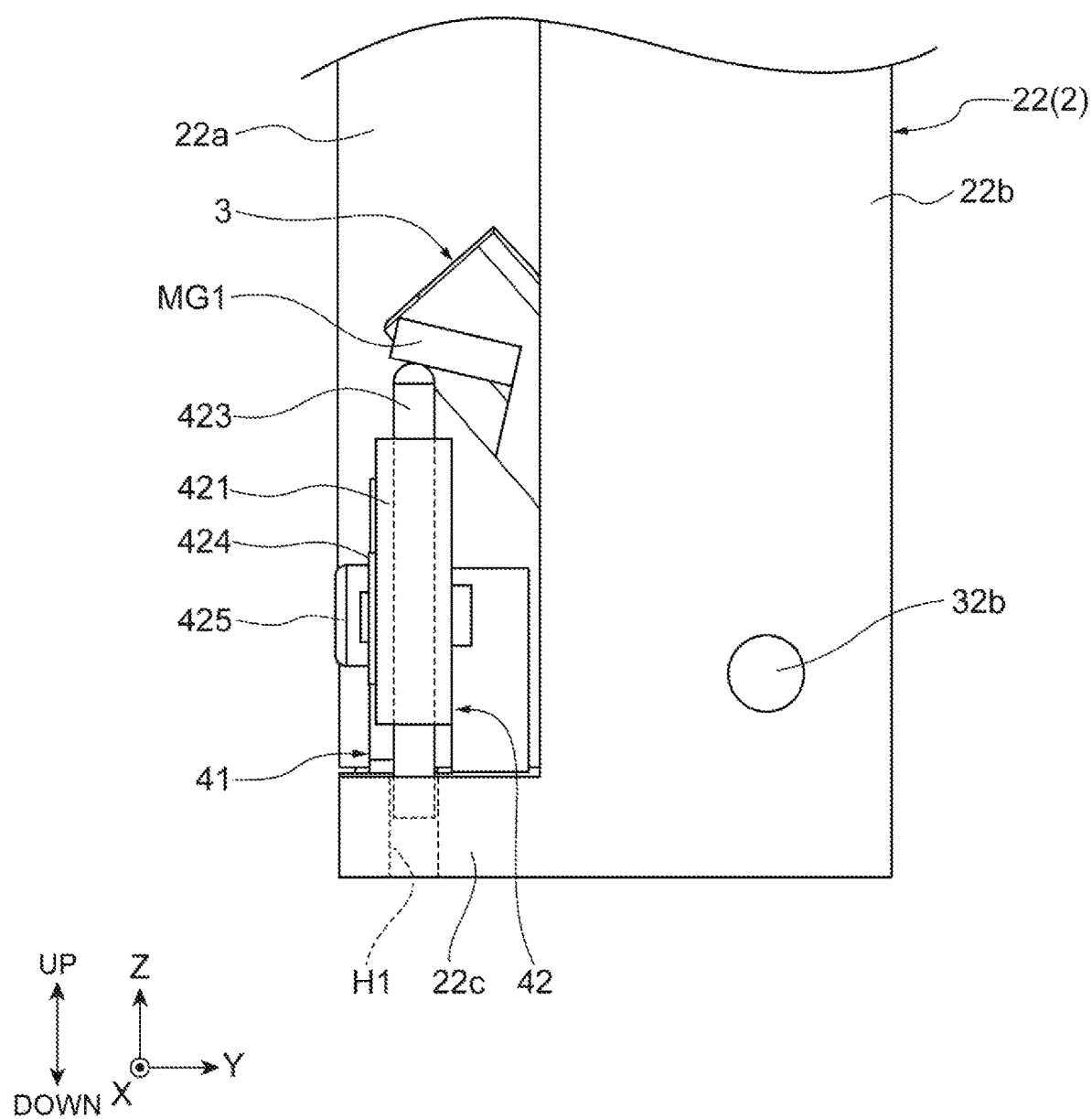
FIG. 13 is a side view of the imaging apparatus according to a modified example in which a pin functions as a rotation-preventing guide.

Although embodiments of the present disclosure have been described, the present disclosure is not limited to these embodiments. For example, as illustrated in FIG. 13, the pin 423 may project out below the lower end of the engaging body main section 421. Moreover, the lower end of the pin 423 may be inserted in a hole H1 extending along the Z axis direction provided in the base panel 22c. In a state in which the lower end of the pin 423 is inserted in the hole H1, the pin 423 is able to move along the Z axis direction with respect to the hole H1. In cases in which the engaging body main section 421 has rotated about the shaft 413, the lower end of the pin 423 makes contact with an inner face of the hole H1. The pin 423 is thereby able to restrict rotation of the engaging body 42 about the shaft 413. In this manner, the pin 423 may also function as a rotation-preventing guide that restricts rotation of the engaging body 42. In this instance, simply by performing insert molding such that the lower end of the pin 423 projects from the engaging body main section 421, the pin 423 can be caused to function as a rotation-preventing guide.

Although the pin 423 of the engaging body 42 has been formed with a convexly-curved shape, the magnet MG1 of the optical-path-changing member 3 may be formed with a convexly-curved shape that curves toward the pin 423. Further, although the optical-path-changing member 3 and the engaging body 42 have been magnetically linked by providing the magnet MG1 on the optical-path-changing member 3 side, a magnet may be provided on the engaging body 42 side to magnetically link the optical-path-changing member 3 and the engaging body 42.

The position where the magnet MG1 is provided is not limited to being near the end of the mirror base 32 on the opposite side of the mirror base 32 to where the shank 32b is provided. Similarly, the position where the shank 32b is provided is not limited to being near the end of the mirror base 32 on the opposite side of the mirror base 32 to where the magnet MG1 is provided.

Further, although the actuator 41 has caused the optical-path-changing member 3 to swing by causing the engaging body 42 to move in the up-down direction, the actuator 41 may cause the optical-path-changing member 3 to slide (move) in a predetermined direction. The actuator 41 is not limited to driving the engaging body 42 using the piezoelectric element 412. The actuator 41 may drive the engaging body 42 using a method of driving other than that using the piezoelectric element 412.

The stoppers ST1 and ST2 are not limited to the configuration described above. The imaging apparatuses 1, 1A may also be configured so as to be provided with only one out of the stoppers ST1 and ST2. Further, configuration may be such that the imaging apparatus 1 and the like are not provided with either of the stoppers ST1 and ST2.

The rotation-preventing guide (guide pin G1, pin 423) that prevents rotation of the engaging body 42 is not limited to the configuration described above. Configuration may be such that the imaging apparatus 1 and the like are not provided with a rotation-preventing guide. Although the pin 423 has been made harder than the magnet MG1, the magnet MG1 may be made harder than the pin 423. Alternatively, the magnet MG1 and the pin 423 may be of the same hardness.

Further, although a drive apparatus has been described as being an imaging apparatus 1, 1A, configuration may be such that the drive apparatus is not provided with the lens module 5 or the image sensor 6. Although the drive apparatus has driven the optical-path-changing member 3, the drive apparatus may drive a driven body other than the optical-path-changing member 3.

What is claimed is:

1. A drive apparatus, comprising:
an actuator;
an engaging body configured to frictionally engage the actuator; and
an optical-path-changing member configured so as to be magnetically linked to the engaging body, and configured to change the direction of an optical path, wherein
the actuator causes the engaging body to move in a first direction and in a second direction opposite to the first direction, and
the optical-path-changing member moves due to being biased by the engaging body when the engaging body has moved in the first direction, and the optical-path-changing member moves following movement of the engaging body due to magnetic attraction when the engaging body has moved in the second direction.

2. The drive apparatus according to claim 1, further comprising:
a stopper configured to restrict a range of movement of the optical-path-changing member, wherein
the stopper restricts at least one range of movement out of a range of movement of the optical-path-changing member caused to move when the engaging body has moved in the first direction, or a range of movement of the optical-path-changing member caused to move when the engaging body has moved in the second direction.

3. The drive apparatus according to claim 1, wherein
the actuator includes
a piezoelectric element able to expand and contract along the first direction, and
a shaft secured to a first direction end of the piezoelectric element, and
the engaging body frictionally engages the shaft.

4. The drive apparatus according to claim 3, further comprising:
a rotation-preventing guide configured to restrict rotation of the engaging body about the shaft.

5. The drive apparatus according to claim 1, further comprising:
a position-detecting sensor configured to detect a position of the optical-path-changing member through a change in a magnetic field, wherein
a magnet for magnetically linking with the engaging body is attached to a portion of the optical-path-changing member configured to make contact with the engaging body, and the position-detecting sensor detects a change in the magnetic field of the magnet attached to the optical-path-changing member.

6. The drive apparatus according to claim 1, wherein either a portion of the engaging body configured to make contact with the optical-path-changing member or a portion of the optical-path-changing member configured to make contact with the engaging body is formed with a convexly-curved shape.

7. The drive apparatus according to claim 6, wherein one of the portion of the engaging body configured to make contact with the optical-path-changing member and the portion of the optical-path-changing member configured to make contact with the engaging body is harder than another of the portion of the engaging body configured to make contact with the optical-path-changing member and the portion of the optical-path-changing member configured to make contact with the engaging body.

8. The drive apparatus according to claim 1, wherein the optical-path-changing member is able to swing about a direction intersecting the first direction, and the actuator causes the optical-path-changing member to swing by moving the engaging body in the first direction and the second direction.

9. A drive apparatus, comprising:
a lens module including a lens;
an image sensor;
an actuator;
an engaging body configured to frictionally engage the actuator; and
an optical-path-changing member configured so as to be magnetically linked to the engaging body, and configured to change the direction of an optical path incident on the image sensor through the lens module, wherein
the actuator causes the engaging body to move in a first direction and in a second direction opposite to the first direction, and
the optical-path-changing member moves due to being biased by the engaging body when the engaging body has moved in the first direction, and the optical-path-changing member moves following movement of the engaging body due to magnetic attraction when the engaging body has moved in the second direction.

10. A drive apparatus, comprising:
an actuator unit; and
a driven body driven by the actuator unit, wherein:
the driven body is magnetically linked to the actuator unit;
the actuator unit includes:
a piezoelectric element able to expand and contract along a predetermined direction;
a shaft secured to one expansion/contraction direction end of the piezoelectric element; and
an engaging body frictionally engaged to the shaft; and
the driven body is magnetically linked to the engaging body.

11. The drive apparatus according to claim 10, further comprising:
a rotation-preventing guide configured to restrict rotation of the engaging body about the shaft.

* * * * *